US006988177B2

(12) United States Patent
Sokol

(10) Patent No.: US 6,988,177 B2
(45) Date of Patent: Jan. 17, 2006

(54) SWITCH MEMORY MANAGEMENT USING A LINKED LIST STRUCTURE

(75) Inventor: Michael A. Sokol, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 771 days.

(21) Appl. No.: 09/855,670

(22) Filed: May 16, 2001

(65) Prior Publication Data

US 2002/0042787 A1    Apr. 11, 2002

Related U.S. Application Data

(60) Provisional application No. 60/237,764, filed on Oct. 3, 2000, provisional application No. 60/242,701, filed on Oct. 25, 2000.

(51) Int. Cl.
G06F 12/00 (2006.01)
G06F 17/30 (2006.01)

(52) U.S. Cl. .................. 711/170; 711/217; 717/162; 707/206

(58) Field of Classification Search ............... 711/170, 711/171, 172, 217, 218, 173; 717/152, 162, 717/156; 707/1, 205, 206
See application file for complete search history.

(56) References Cited

U.S. PATENT DOCUMENTS

| | | | |
|---|---|---|---|
| 5,159,678 A * | 10/1992 | Wengelski et al. ........ | 711/153 |
| 5,278,789 A | 1/1994 | Inoue et al. | |
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |

(Continued)

FOREIGN PATENT DOCUMENTS

EP    0312917 A2    4/1989

(Continued)

OTHER PUBLICATIONS

"A High-Speed CMOS Circuit for 1.2-Gb/s 16 x 16 ATM Switching," Alain Chemarin et al. 8107 IEEE Journal of Solid-State Circuits 27(1992) Jul., No. 7, New York, US, pp. 1116-1120.

(Continued)

*Primary Examiner*—Hong Kim
(74) *Attorney, Agent, or Firm*—Squire, Sanders & Dempsey L.L.P.

(57)    ABSTRACT

A memory management method that has the steps of assigning pointers to free memory locations and linking the pointers to one another creating a linked list of free memory locations having a beginning and an end. A free head pointer is assigned to a memory location indicating the beginning of free memory locations and a free tail pointer is assigned to a memory location indicating the end of free memory locations. An initial data pointer is assigned to the memory location assigned to the free head pointer and an end of data pointer is assigned to a last data memory location. The free head pointer is assigned to a next memory location linked to the last data memory location assigned to the end of data pointer. The next memory location indicates the beginning of free memory locations.

16 Claims, 6 Drawing Sheets

U.S. PATENT DOCUMENTS

| | | | |
|---|---|---|---|
| 5,696,899 A | 12/1997 | Kalwitz | |
| 5,724,358 A * | 3/1998 | Headrick et al. | 370/418 |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,987,507 A | 11/1999 | Creedon et al. | |
| 6,011,795 A | 1/2000 | Varghese et al. | |
| 6,041,053 A | 3/2000 | Douceur et al. | |
| 6,061,351 A | 5/2000 | Erimli et al. | |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,292,492 B1 * | 9/2001 | Bonomi et al. | 370/415 |
| 6,430,666 B1 * | 8/2002 | Roth | 711/202 |
| 6,614,793 B1 * | 9/2003 | Richards et al. | 370/395.64 |
| 6,625,591 B1 * | 9/2003 | Vahalia et al. | 707/1 |
| 6,820,086 B1 * | 11/2004 | Iacobovici et al. | 707/100 |

FOREIGN PATENT DOCUMENTS

| | | |
|---|---|---|
| EP | 0465090 A1 | 1/1992 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/s 8 x 8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

FIG.4B

416 LINKING MEMORY LOCATION ASSIGNED TO THE FREE TAIL POINTER TO THE MEMORY LOCATION ASSIGNED TO THE INITIAL DATA POINTER

418 ASSIGNING FREE TAIL POINTER TO THE MEMORY LOCATION ASSIGNED TO THE END OF DATA POINTER

FIG.5

| POINTER ASSIGNOR 500 | LINKER 502 |
|---|---|
| FREE HEAD POINTER ASSIGNOR 504 | INITIAL DATA POINTER ASSIGNOR 508 |
| FREE TAIL POINTER ASSIGNOR 506 | END OF DATA POINTER ASSIGNOR 512 |
| DATA ASSIGNOR 510 | |

SWITCH MEMORY MANAGEMENT USING A LINKED LIST STRUCTURE

REFERENCE TO RELATED APPLICATIONS

This application claims priority to U.S. Provisional Patent Application Ser. No. 60/237,764 filed on Oct. 3, 2000 and U.S. Provisional Patent Application Ser. No. 60/242,701 filed on Oct. 25, 2000. The contents of both of the provisional applications identified above are hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture geared to power efficient and cost sensitive markets, and which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. A gigabit Ethernet is capable of transmitting data over a network at a rate of up to 1,000 megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a scheme for reducing clock speed and power consumption in a network chip.

In one embodiment, the invention is a memory management method. The method has the steps of assigning pointers to free memory locations and linking the pointers to one another creating a linked list of free memory locations having a beginning and an end. A free head pointer is assigned to a memory location indicating the beginning of free memory locations and a free tail pointer is assigned to a memory location indicating the end of free memory locations. An initial data pointer is assigned to the memory location assigned to the free head pointer and an end of data pointer is assigned to a last data memory location. The free head pointer is assigned to a next memory location linked to the last data memory location assigned to the end of data pointer. The next memory location indicates the beginning of free memory locations.

In another embodiment, the invention is a memory management method. The method has the steps of assigning pointers to free memory locations and linking the pointers to one another creating a linked list of free memory locations having a beginning and an end. A free head pointer is assigned to a memory location indicating the beginning of free memory locations and a free tail pointer is assigned to a memory location indicating the end of free memory locations. The memory location assigned to the free tail pointer is linked to the memory location assigned to an initial data pointer when memory locations occupied by data is to be indicated as free memory. The free tail pointer is assigned to the last data memory location assigned to the end of data pointer.

Another embodiment of the invention is a memory management system. The system has a pointer assignor that assigns pointers to free memory locations and a linker that links said pointers to one another thereby creating a linked list of free memory locations having a beginning and an end. A free head pointer assignor assigns a free head pointer to a memory location indicating the beginning of free memory locations and a free tail pointer assignor assigns a free tail pointer to a memory location indicating the end of free memory locations. An initial data pointer assignor assigns an initial data pointer to the memory location assigned to the free head pointer and an end of data pointer assignor assigns an end of data pointer to a last data memory location. The free head pointer assignor assigns the free head pointer to a next memory location linked to the last data memory location assigned to said end of data pointer. The next memory location indicates the beginning of free memory locations.

The invention in another embodiment is a memory management system. The system has a pointer assignor that assigns pointers to free memory locations, and a linker that links the pointers to one another thereby creating a linked list of free memory locations having a beginning and an end. A free head pointer assignor assigns a free head pointer to a memory location indicating the beginning of free memory locations, and a free tail pointer assignor that assigns a free tail pointer to a memory location indicating the end of free memory locations. The linker links the memory location assigned to the free tail pointer to the memory location assigned to an initial data pointer when memory locations occupied by data is to be indicated as free memory and the free tail pointer assignor assigns the free tail pointer to the last data memory location assigned to said end of data pointer.

Another embodiment of the invention is a memory management system having a pointer assignor means for assigning pointers to free memory locations. A linker means links the pointers to one another thereby creating a linked list of free memory locations having a beginning and an end, and a free head pointer assignor assigns a free head pointer to a memory location indicating the beginning of the linked list of free memory locations. A free tail pointer assignor assigns a free tail pointer to a memory location indicating the end of the linked list of free memory locations, and an initial data pointer assignor means that assigns an initial data pointer to the memory location assigned to the free head pointer. An end of data pointer assignor means assigns an end of data pointer to a last data memory location. The free head pointer assignor means assigns the free head pointer to a next memory location linked to the last data memory location assigned to the end of data pointer, wherein the next memory location indicates the beginning of free memory locations.

In another embodiment, the invention is a memory management system having a pointer assignor means for assigning pointers to free memory locations and a linker means for linking the pointers to one another thereby creating a linked list of free memory locations having a beginning and an end. A free head pointer assignor means assigns a free head pointer to a memory location indicating the beginning of the linked list of free memory locations, and a free tail pointer assignor means assigns a free tail pointer to a memory location indicating the end of the linked list of free memory locations. The linker means links the memory location assigned to the free tail pointer to the memory location assigned to an initial data pointer when memory locations occupied by data is to be indicated as free memory. The free tail pointer assignor means assigns the free tail pointer to the last data memory location assigned to the end of data pointer.

The invention is in another embodiment a memory management device having a pointer assignor that assigns pointers to free memory locations of a memory. The pointer assignor is in communication with the memory. A linker links the pointers to one another thereby creating a linked list of free memory locations having a beginning and an end. The linker is also in communication with the memory. A free head pointer assignor assigns a free head pointer to a memory location indicating the beginning of the linked list of free memory locations. The free head pointer assignor is in communication with the memory. A free tail pointer assignor assigns a free tail pointer to a memory location indicating the end of the linked list of free memory locations. The free tail pointer assignor is in communication with the memory. An initial data packet pointer assignor assigns an initial data packet pointer to the memory location assigned to the free head pointer. The initial data packet pointer assignor is in communication with the memory. An end of data packet pointer assignor that assigns an end of data packet pointer to a last data memory location in the memory, and the end of data packet pointer assignor is in communication with the memory. The free head pointer assignor assigns the free head pointer to a next memory location linked to the last data packet memory location assigned to the end of data packet pointer, wherein the next memory location indicates said beginning of free memory locations.

In another embodiment, the invention is a memory management device having a pointer assignor that assigns pointers to free memory locations of a memory. The pointer assignor is in communication with the memory. A linker links the pointers to one another thereby creating a linked list of free memory locations having a beginning and an end. The linker is in communication with the memory. A free head pointer assignor assigns a free head pointer to a memory location indicating the beginning of the linked list of free memory locations. The free head pointer assignor is also in communication with the memory. A free tail pointer assignor assigns a free tail pointer to a memory location indicating the end of the linked list of free memory locations. The free tail pointer assignor is in communication with the memory. The linker links the memory location assigned to the free tail pointer to the memory location assigned to an initial data pointer when memory locations occupied by data is to be indicated as free memory, and the free tail pointer assignor assigns the free tail pointer to the last data memory location assigned to the end of data pointer.

BRIEF DESCRIPTION OF THE DRAWINGS

The objects and features of the invention will be more readily understood with reference to the following description and the attached drawings, wherein:

FIG. 4B is a flow diagram of the steps to add memory locations designated for data to a linked list of free memory.

FIG. 5 is an illustration of a system for managing a linked list of free memory.

Figure 1:
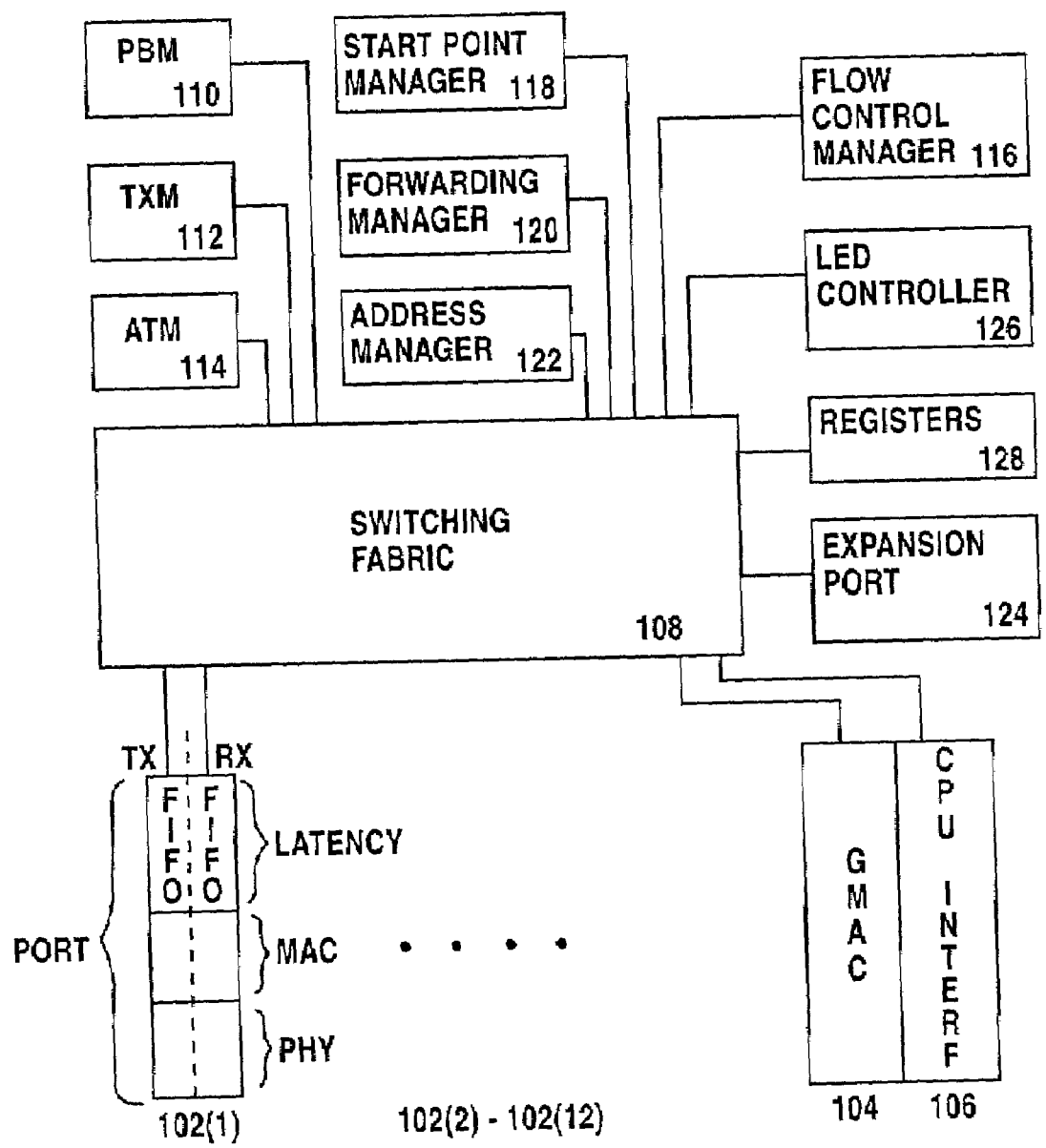
FIG. 1 is a general block diagram of elements of the present invention.

DETAILED DESCRIPTION OF THE INVENTION:

FIG. 1 is an example of a block diagram of a switch 100 of the present invention. In this example, switch 100 has 12 ports, 102(1)–102(12), which can be fully integrated IEEE compliant ports. Each of these 12 ports 102(1)–102(12) can be 10 BASE-T/100BASE-TX/FX ports each having a physical element (PHY), which can be compliant with IEEE standards. Each of the ports 102(1)–102(12), in one example of the invention, has a port speed that can be forced to a particular configuration or set so that auto-negotiation will determine the optimal speed for each port independently. Each PHY of each of the ports can be connected to a twisted-pair interface using TXOP/N and RXIP/N as transmit and receive protocols, or a fiber interface using FXOP/N and FXIP/N as transmit and receive protocols.

Each of the ports 102(1)–102(12) has a Media Access Controller (MAC) connected to each corresponding PHY. In one example of the invention, each MAC is a fully compliant IEEE 802.3 MAC. Each MAC can operate at 10 Mbps or 100 Mbps and supports both a full-duplex mode, which allows for data transmission and reception simultaneously, and a half duplex mode, which allows data to be either transmitted or received, but not both at the same time.

Flow control is provided by each of the MACs. When flow control is implemented, the flow of incoming data packets is managed or controlled to reduce the chances of system resources being exhausted. Although the present embodiment can be a non-blocking, wire speed switch, the memory space available may limit data transmission speeds. For example, during periods of packet flooding (i.e. packet broadcast storms), the available memory can be exhausted rather quickly. In order to enhance the operability of the switch in these types of situations, the present invention can implement two different types of flow control. In full-duplex mode, the present invention can, for example, implement the IEEE 802.3x flow control. In half-duplex mode, the present invention can implement a collision backpressure scheme.

In one example of the present invention each port has a latency block connected to the MAC. Each of the latency blocks has transmit and receive FIFOs which provide an interface to main packet memory. In this example, if a packet does not successfully transmit from one port to another port within a preset time, the packet will be dropped from the transmit queue.

In addition to ports 102(1)–102(12), a gigabit interface 104 can be provided on switch 100. Gigabit interface 104 can support a Gigabit Media-Independent Interface (GMII) and a Ten Bit Interface (TBI). The GMII can be fully compliant to IEEE 802.3ab. The GMII can pass data at a rate of 8 bits every 8 ns resulting in a throughput of 2 Gbps including both transmit and receive data. In addition to the GMII, gigabit interface 104 can be configured to be a TBI, which is compatible with many industry standard fiber drivers. Since in some embodiments of the invention the MDIO/MDC interfaces (optical interfaces) are not supported, the gigabit PHY (physical layer) is set into the proper mode by the system designer.

Gigabit interface 104, like ports 102(1)–102(12), has a PHY, a Gigabit Media Access Controller (GMAC) and a latency block. The GMAC can be a fully compliant IEEE 802.3z MAC operating at 1 Gbps full-duplex only and can connect to a fully compliant GMII or TBI interface through the PHY. In this example, GMAC 108 provides full-duplex flow control mechanisms and a low cost stacking solution for either twisted pair or TBI mode using in-band signaling for management. This low cost stacking solution allows for a ring structure to connect each switch utilizing only one gigabit port.

A CPU interface 106 is provided on switch 100. In one example of the present invention, CPU interface 106 is an asynchronous 8 or 16 bit I/O device interface. Through this interface a CPU can read internal registers, receive packets, transmit packets and allow for interrupts. CPU interface 106 also allows for a Spanning Tree Protocol to be implemented. In one example of the present invention, a chip select pin is available allowing a single CPU control two switches. In this example an interrupt pin when driven low (i.e., driven to the active state) requiring a pull-up resistor will allow multiple switches to be controlled by a single CPU.

A switching fabric 108 is also located on switch 100 in one example of the present invention. Switching fabric 108 can allow for full wire speed operation of all ports. A hybrid or virtual shared memory approach can also be implemented to minimize bandwidth and memory requirements. This architecture allows for efficient and low latency transfer of packets through the switch and also supports address learning and aging features, VLAN, port trunking and port mirroring.

Memory interfaces 110, 112 and 114 can be located on switch 100 and allow for the separation of data and control information. Packet buffer memory interface (PBM) 110 handles packet data storage while the transmit queue memory interface (TXM) 112 keeps a list of packets to be transmitted and address table/control memory interface (ATM) 114 handles the address table and header information. Each of these interfaces can use memory such as SSRAM that can be configured in various total amounts and chip sizes.

PBM 110 is located on switch 100 and can have an external packet buffer memory (not shown) that is used to store the packet during switching operations. In one example of the invention, packet buffer memory is made up of multiple 256 byte buffers. Therefore, one packet may span several buffers within memory. This structure allows for efficient memory usage and minimizes bandwidth overhead. The packet buffer memory can be configurable so that up to 4 Mbytes of memory per chip can be used for a total of 8 Mbytes per 24+2 ports. In this example, efficient memory usage is maintained by allocating 256 byte blocks, which allows storage for up to 32K packets. PBM 110 can be 64 bits wide and can use either a 64 bit wide memory or two 32 bit wide memories and can run at 100 MHz.

TXM 112 is located on switch 100 and can have an external transmit queue memory (not shown). TXM 112, in this example, maintains 4 priority queues per port and allows for 64K packets per chip and up to 128K packets per system. TXM 112 can run at a speed of up to 100 MHz.

ATM 114 can be located on switch 100 and can have an external address table/control memory (not shown) used to store the address table and header information corresponding to each 256 byte section of PBM 110. Address table/control memory allows up to 16K unique unicast addresses. The remaining available memory is used for control information. ATM 114, in this example, runs up to 133 MHz.

Switch 100, in one example of the invention, has a Flow Control Manager 116 that manages the flow of packet data. As each port sends more and more data to the switch, Flow Control Manager 116 can monitor the amount of memory being used by each port 102(1)–102(12) of switch 100 and the switch as a whole. In this example, if one of the ports 102(1)–102(12) or the switch as a whole is using up too much memory as is predetermined by a register setting predefined by the manufacturer or by a user, Flow Control Manager 116 will issue commands over the ATM Bus requesting the port or switch to slow down and may eventually drop packets if necessary.

In addition to Flow control manager 116, switch 100 also has a Start Point Manager (SPM) 118 connected to Switching Fabric 108, a Forwarding Manager (FM) 120 connected to Switching Fabric 108 and an Address Manager (AM) 122 connected to Switching Fabric 108.

Start Point Manager (SPM) 118, through Switching Fabric 108 in one example of the present invention, keeps track of which blocks of memory in PBM 110 are being used and which blocks of memory are free.

Forwarding Manager 120 can, for example, forward packet data through Switching Fabric 108 to appropriate ports for transmission.

Address Manager (AM) 122 can, through Switching Fabric 108, manage the address table including learning source addresses, assigning headers to packets and keeping track of these addresses. In one example of the invention, AM 122 uses aging to remove addresses from the address table that have not been used for a specified time period or after a sequence of events.

An expansion port 124 can also be provided on switch 100 to connect two switches together. This will allow for full wire speed operation on twenty-five 100 M ports (includes one CPU port) and two gigabit ports. The expansion port 124, in this example, allows for 4.6 Gbps of data to be transmitted between switches.

An LED controller 126 can also be provided on switch 100. LED controller 126 activates appropriate LEDs to give a user necessary status information. Each port of the ports 102(1)–102(12), in one example of the invention, has 4 separate LEDs, which provide per port status information. The LEDs are fully programmable and are made up of port LEDs and other LEDs. Each LED can include a default state for each of the four port LEDs. An example of the default operation of each of the port LEDs are wn below.

| LED | DEFAULT OPERATION |
|---|---|
| 0 | Speed Indicator<br>OFF = 10 Mbps or no link<br>ON = 100 Mbps |
| 1 | Full/Half/Collision Duplex<br>OFF = The port is in half duplex or no link<br>BLINK = The port is in half duplex and a collision has occurred<br>ON = The port is in full duplex |
| 2 | Link/Activity Indicator<br>OFF = Indicates that the port does not have link<br>BLINK = Link is present and receive or transmit activity is occurring on the media<br>ON = Link present without activity |
| 3 | Alert Condition<br>OFF = No alert conditions, port is operating normally<br>ON = The port has detected an isolate condition |

In addition to the default operations for the port LEDs, each of the port LEDs can be programmed through registers. These registers can be set up, in one example of the invention, by a CPU. By having programmable registers that control LEDs, full customization of the system architecture can be realized including the programmability of the blink rate.

Each of the LEDs can have a table, as shown below, associated with the LED, where register bits $R_{Ax}$, $R_{Bx}$ and $R_{Cx}$ can be set to provide a wide range of information.

| Event | ON Condition | BLINK Condition | OFF Condition |
|---|---|---|---|
| Link (L) | $A_0 = (R_{A0} \& L) \mid !R_{A0}$ | $B_0 = (R_{B0} \& L) \mid !R_{B0}$ | $C_0 = (R_{C0} \& L) \mid !R_{C0}$ |
| Isolate (I) | $A_1 = (R_{A1} \& I) \mid !R_{A1}$ | $B_1 = (R_{B1} \& I) \mid !R_{B1}$ | $C_1 = (R_{C1} \& I) \mid !R_{C1}$ |
| Speed (S) | $A_2 = (R_{A2} \& S) \mid !R_{A2}$ | $B_2 = (R_{B2} \& S) \mid !R_{B2}$ | $C_2 = (R_{C2} \& S) \mid !R_{C2}$ |
| Duplex (D) | $A_3 = (R_{A3} \& D) \mid !R_{A3}$ | $B_3 = (R_{B3} \& D) \mid !R_{B3}$ | $C_3 = (R_{C3} \& D) \mid !R_{C3}$ |
| TX/RX Activity (TRA) | $A_4 = (R_{A4} \& TRA) \mid !R_{A4}$ | $B_4 = (R_{B4} \& TRA) \mid !R_{B4}$ | $C_4 = (R_{C4} \& TRA) \mid !R_{C4}$ |
| TX Activity (TA) | $A_5 = (R_{A5} \& TA) \mid !R_{A5}$ | $B_5 = (R_{B5} \& TA) \mid !R_{B5}$ | $C_5 = (R_{C5} \& TA) \mid !R_{C5}$ |
| RX Activity (RA) | $A_6 = (R_{A6} \& RA) \mid !R_{A6}$ | $B_6 = (R_{B6} \& RA) \mid !R_{B6}$ | $C_6 = (R_{C6} \& RA) \mid !R_{C6}$ |
| Auto-Negotiate Active (N) | $A_7 = (R_{A7} \& N) \mid !R_{A7}$ | $B_7 = (R_{B7} \& N) \mid !R_{B7}$ | $C_7 = (R_{C7} \& N) \mid !R_{C7}$ |
| Port Disabled (PD) | $A_8 = (R_{A8} \& PD) \mid !R_{A8}$ | $B_8 = (R_{B8} \& PD) \mid !R_{B8}$ | $C_8 = (R_{C8} \& PD) \mid !R_{C8}$ |
| Collision © | $A_9 = (R_{A9} \& C) \mid !R_{A9}$ | $B_9 = (R_{B9} \& C) \mid !R_{B9}$ | $C_9 = (R_{C9} \& C) \mid !R_{C9}$ |
| Result | $LED_{ON} = (A_0 \& A_1 \& A_2 \& A_3 \& A_4 \& A_5 \& A_6 \& A_7 \& A_8 \& A_9) \& (LED_{BLINK} \& LED_{OFF})$ | $LED_{BLINK} = (B_0 \& B_1 \& B_2 \& B_3 \& B_4 \& B_5 \& B_6 \& B_7 \& B_8 \& B_9) \& LED_{OFF}$ | $LED_{OFF} = (C_0 \& C_1 \& C_2 \& C_3 \& C_4 \& C_5 \& C_6 \& C_7 \& C_8 \& C_9)$ |

For example, register bits $R_{Ax}$, $R_{Bx}$ and $R_{Cx}$ can be set to determine when $LED_{ON}$, $LED_{BLINK}$ and $LED_{OFF}$ are activated or deactivated. In addition to the port LEDs, there are additional LEDs which indicate the status of the switch.

Registers 128 are located on switch 100 in this example of the present invention. Registers 128 are full registers that allow for configuration, status and Remote Monitoring (RMON) management. In this example, Registers 128 are arranged into groups and offsets. There are 32 address groups each of which can contain up to 64 registers.

Figure 2:
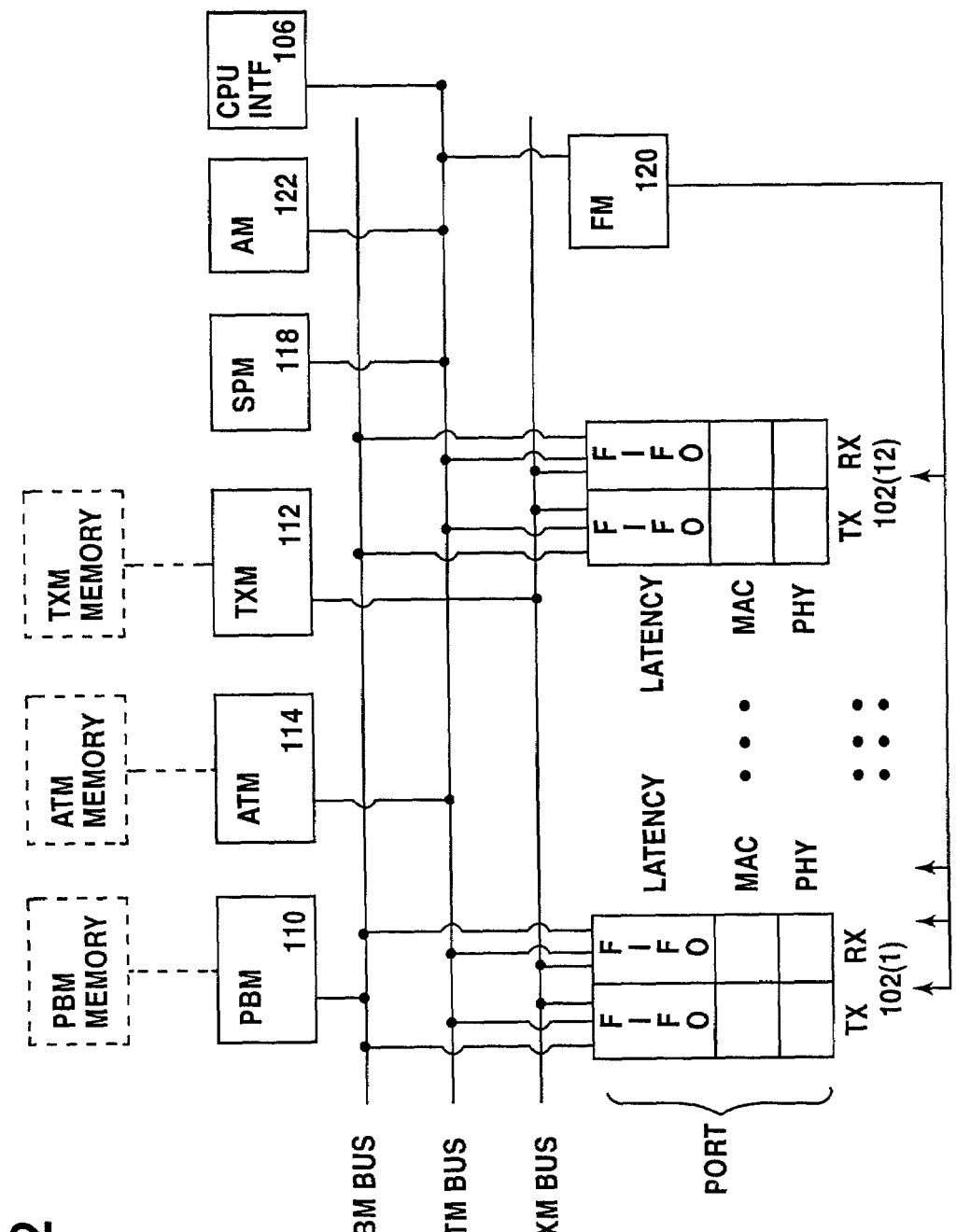
FIG. 2 illustrates the data flow on the CPS channel of a network switch according to the present invention.

FIG. 2 is an illustration of one embodiment of the invention having a PBM Bus, an ATM Bus, and a TXM Bus for communications with other portions of the switch. In this example PBM 110 is connected to the PBM Bus and an external PBM Memory; TXM 112 is connected to the TXM Bus and an external TXM Memory; and ATM 114 is connected to the ATM Bus and an external ATM Memory. Each of the transmit (TX) and receive (RX) portions of ports 102(1)–102(12) are connected to the PBM Bus, ATM Bus and TXM Bus for communications.

FM 120 is connected to each of the ports 102(1)–102(12) directly and is also connected to the ATM Bus for communications with other portions of the switch. SPM 118 and AM 122 are also connected to the ATM Bus for communications with other portions of the switch.

The operation of switch 100 for transmission of a unicast packet (i.e., a packet destined for a single port for output) in one example of the invention is made with reference to FIG. 2 as follows.

In this example, Switch 100 is initialized following the release of a hardware reset pin. A series of initialization steps will occur including the initialization of external buffer memory and the address table. All ports on the switch will then be disabled and the CPU will enable packet traffic by setting an enable register. As links become available on the ports (ports 102(1)–102(12) and gigabit port 104), an SPT protocol will confirm these ports and the ports will become activated. After the initialization process is concluded normal operation of Switch 100 can begin.

In this example, once a port has been initialized and activated, a PORT_ACTIVE command is issued by CPU. This indicates that the port is ready to transmit and receive data packets. If for some reason a port goes down or becomes disabled, a PORT_INACTIVE command is issued by the CPU.

During unicast transmission, a packet from an external source on port 102(1) is received at the receive (RX) PHY of port 102(1).

In this example, the RX MAC of port 102(1) will not start processing the packet until a Start of Frame Delimiter (SFD) for the packet is detected. When the SFD is detected by the RX MAC portion of port 102(1), the RX MAC will place the packet into a receive (RX) FIFO of the latency block of port 102(1). As the RX FIFO becomes filled, port 102(1) will request an empty receive buffer from the SPM. Once access to the ATM Bus is granted, the RX FIFO Latency block of port 102(1) sends packets received in the RX FIFO to the external PBM Memory through the PBM Bus and PBM 110 until the end of packet is reached.

The PBM Memory, in this example, is made up of 256 byte buffers. Therefore, one packet may span several buffers within the packet buffer memory if the packet size is greater than 256 bytes. Connections between packet buffers can be maintained through a linked list system in one example of the present invention. A linked list system allows for efficient memory usage and minimized bandwidth overhead and will be explained in further detail with relation to FIG. 3A–FIG. 3D.

At the same time packets are being sent to the external PBM Memory, the port will also send the source address to Address Manager (AM) 122 and request a filtering table from AM 122.

If the packet is "good", as is determined through normal, standard procedures known to those of ordinary skill in the art, such as valid length and IEEE standard packet checking such as a Cyclic Redundancy Check, the port writes the header information to the ATM memory through the ATM Bus and ATM 114. AM 122 sends a RECEP_COMPL command over the ATM Bus signifying that packet reception is complete. Other information is also sent along with the RECEP_COMPL command such as the start address and filtering table which indicates which ports the packet is to be sent out on. For example, a filtering table having a string such as "011111111111" would send the packet to all ports except port 1 and would have a count of 11. The count simply is the number of ports the packet is to be sent, as indicated by the number of "1"s.

Forwarding Manager (FM) 120 is constantly monitoring the ATM Bus to determine if a RECEP_COMPL command has been issued. Once FM 120 has determined that a RECEP_COMPL command has been issued, Forwarding Manager (FM) 120 will use the filtering table to send packets to appropriate ports. It is noted that a packet will not be forwarded if one of the following conditions is met:

a. The packet contains a CRC error
b. The PHY signals a receive error
c. The packet is less than 64 bytes
d. The packet is greater than 1518 bytes or 1522 bytes depending on register settings
e. The packet is only forwarded to the receiving port The RECEP_COMPL command includes information such as a filter table, a start pointer, priority information and other miscellaneous information. FM 120 will read the filter table to determine if the packet is to be transmitted from one of its ports. If it is determined that the packet is to be transmitted from one of its ports, FM 120 will send the RECEP_COMPL command information directly to the port. In this case, the RECEP_COMPL command information is sent to the TX FIFO of port 102(12).

If the port is busy, the RECEP_COMPL command information is transferred to TXM Memory through the TXM Bus and TXM 112. The TXM memory contains a queue of packets to be transmitted. TXM Memory is allocated on a per port basis so that if there are ten ports there are ten queues within the TXM Memory allocated to each port. As each of the ports transmitters becomes idle, each port will read the next RECEP_COMPL command information stored in the TXM Memory. The TX FIFO of port 102(12) will receive, as part of the RECEP_COMPL command information, a start pointer which will point to a header in ATM memory across the ATM Bus which in turn points to the location of a packet in the PBM Memory over the PBM Bus. The port will at this point request to load the packet into the transmit (TX) FIFO of port 102(12) and send it out through the MAC and PHY of port 102(12).

If the port is in half duplex mode, it is possible that a collision could occur and force the packet transmission to start over. If this occurs, the port simply re-requests the bus master and reloads the packet and starts over again. If however, the number of consecutive collisions becomes excessive, the packet will be dropped from the transmission queue.

Once the port successfully transmits a packet, the port will signal FM 120 that it is done with the current buffer. FM 120 will then decrement a counter which indicates how many more ports must transmit the packet. For example, if a packet is destined to eleven ports for output, the counter, in this example, is set to 11. Each time a packet is successfully transmitted, FM 120 decrements the counter by one. When the counter reaches zero this will indicate that all designated ports have successfully transmitted the packet. FM 120 will then issue a FREE command over the ATM Bus indicating that the memory occupied by the packet in the PBM Memory is no longer needed and can now be freed for other use.

When SPM 118 detects a FREE command over the ATM Bus, steps are taken to indicate that the space taken by the packet is now free memory.

Multicast and broadcast packets are handled exactly like unicast packets with the exception that their filter tables will indicate that all or most ports should transmit the packet. This will force the forwarding managers to transmit the packet out on all or most of their ports.

Figure 3A:
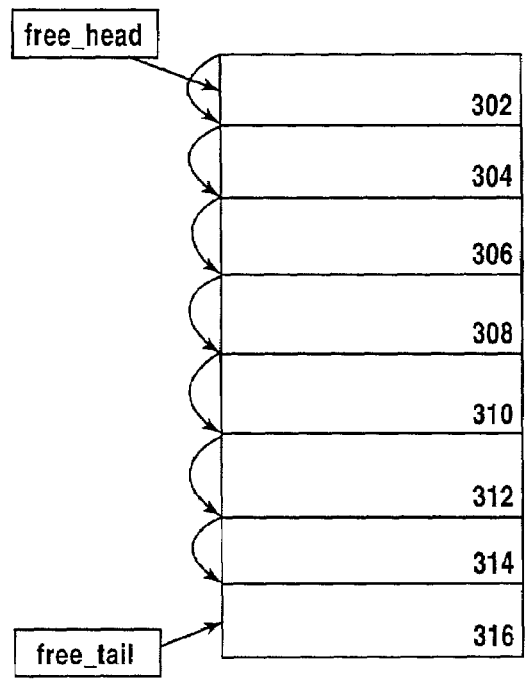
FIG. 3A illustrates a linked list structure of Packet Buffer Memory.

FIG. 3A is an illustration of a PBM Memory structure in one example of the invention. PBM Memory Structure 300 is a linked list of 256 byte segments 302, 304, 306, 308, 310, 312, 314 and 316. In this example segment 302 is the free_head indicating the beginning of the free memory linked list and segment 316 is the free_tail indicating the last segment of free memory.

Figure 3B:
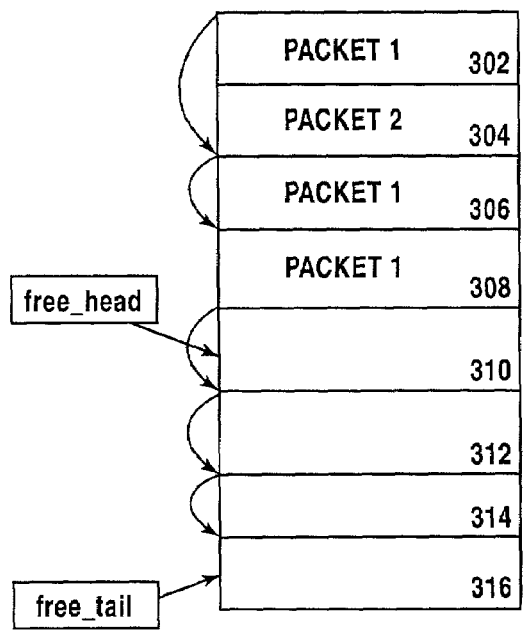
FIG. 3B illustrates a linked list structure of Packet Buffer Memory with two data packets.

In FIG. 3B two packets have been received and stored in the PBM Memory. Packet 1 occupies segments 302, 306 and 308 and packet 2 occupies segment 304. Segments 310, 312, 314 and 316 are free memory. Segment 310 is the free_head indicating the beginning of free memory and segment 316 is the free_tail indicating the end of free memory.

Figure 3C:
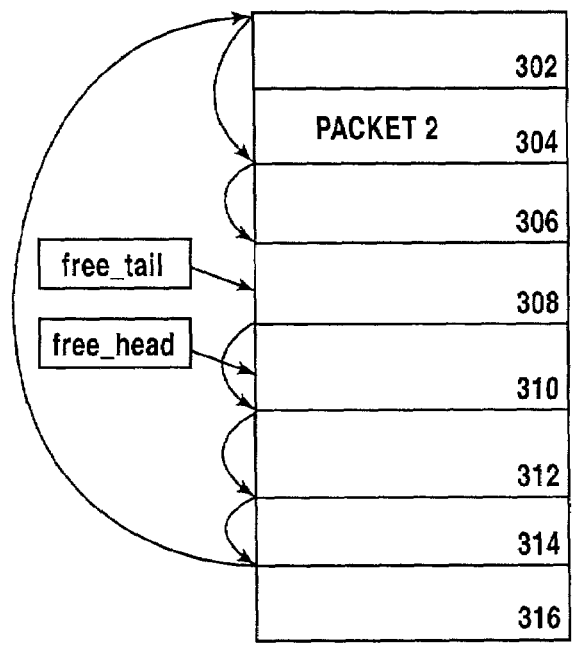
FIG. 3C illustrates a linked list structure of Packet Buffer Memory after the memory occupied by one data packet is freed.

In FIG. 3C packet 1 has been fully transmitted and the Forwarding Manager (FM) has issued a FREE command. Since packet 1 is already in a linked list format the SPM can add the memory occupied by packet 1 to the free memory link list. The free_head, segment 310 remains the same. However, the free_tail is changed. This is accomplished by linking segment 316 to the beginning of packet 1, segment 302, and designating the last segment of packet 1, segment 308, as the free_tail. As a result, there is a linked list starting with segment 310 linking to segment 312, segment 312 linking to segment 314, segment 314 linking to segment 316, segment 316 linking to segment 302, segment 302 linking to segment 306 and segment 306 linking to segment 308 where segment 308 is the free_tail.

Figure 3D:
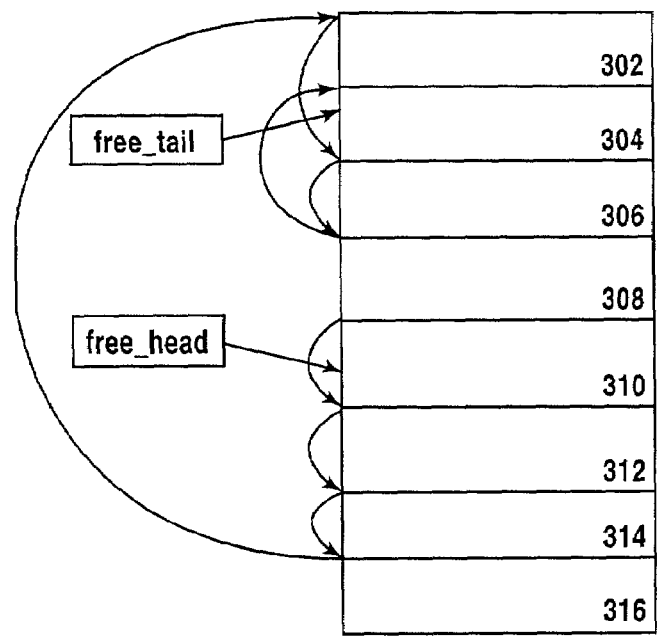
FIG. 3D illustrates a linked list structure of Packet Buffer Memory after the memory occupied by another data packet is freed.

FIG. 3D in this example simply illustrates the PBM Memory after packet 2 has been transmitted successfully and the Forwarding Manager has issued a FREE command over the ATM Bus. The SPM will detect the FREE command and then add the memory space occupied by packet 2 in the PBM Memory to the free memory linked list. In this example segment 308 is linked to the memory occupied by packet 2, segment 304, and segment 304 is identified as the free_tail.

Figure 4A:
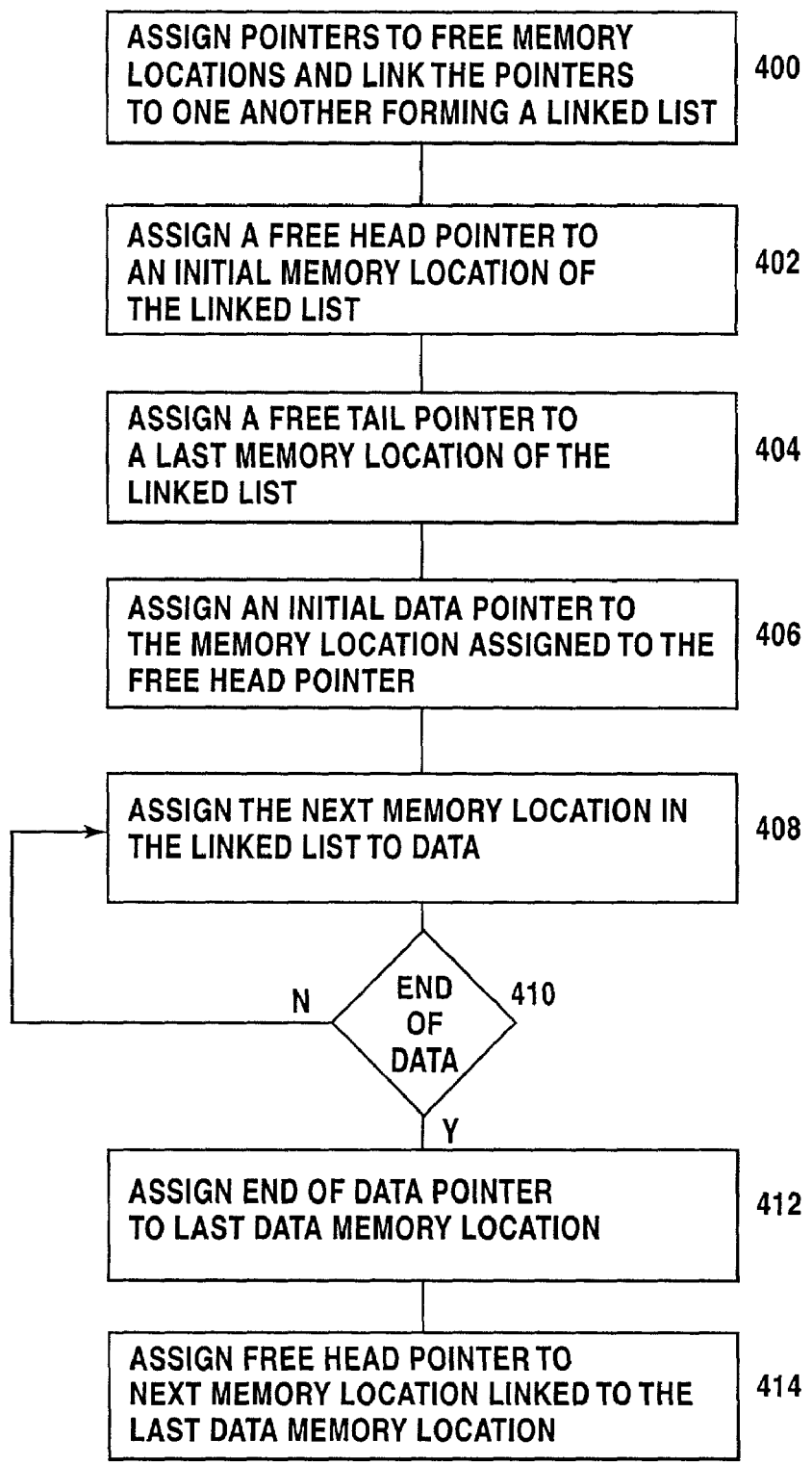
FIG. 4A is a flow diagram of the steps to assign data to memory locations in a linked list of free memory.

FIG. 4A is an illustration of the method steps taken in one embodiment of the invention. The steps are described in relation with FIGS. 3A–3D. In step 400, free memory locations 302, 304, 306, 308, 310, 312, 314 and 316 are linked to one another forming a linked list of free memory. In the embodiment shown in FIG. 3A, memory location 302 has a pointer linking memory location 302 to memory location 304. Likewise, memory location 304 has a pointer which links memory location 304 to memory location 306. As can be seen in FIG. 3A, the memory locations in this embodiment of the invention are initially sequentially linked to one another where memory location 302 is linked to memory location 304, memory location 304 is linked to memory location 306, memory location 306 is linked to memory location 308, etc.

In step 402, a free_head pointer is assigned to an initial memory location of the linked list of free memory. As can be seen in the example illustrated in FIG. 3A, the free_head pointer is assigned to memory location 302.

In step 404, a free tail pointer is assigned to a last memory location of the linked list. In the example illustrated in FIG. 3A, the free tail is assigned to memory location 316, which in this case is the last memory location of the linked list of free memory.

In step 406, an initial data pointer is assigned to the memory location assigned to the free head pointer. For example, referring back to FIG. 3A, if a first packet of data were to be saved, the initial data pointer would be assigned to memory location 302 where the free head pointer was assigned. In step 408, the next memory location linked to the memory location assigned to the initial data pointer would be assigned to store more data. For example, if the data would require free memory locations, memory locations 304 and 306 would also be assigned to data packet 1. At memory location 306, an end of data pointer would be assigned to this last data location. The free head pointer would then be assigned to memory location 308 indicating the beginning of free memory as described in step 414.

In another example illustrated in FIG. 3B, a free head pointer initially points to memory location 302 and packet 2 occupies memory location 304. When data packet 1 is to be saved, the initial data pointer is assigned to memory location 302. In this example, packet 1 needs three memory locations and in this case, memory location 306 was linked to memory location 302 and memory location 308 was linked to memory location 306. Thus, the data pointers for packet 1 are assigned to memory locations 302, 306 and 308. The end of data pointer is assigned to memory location 308.

In step 414, the free head pointer is assigned to the next memory location linked to the last data memory location 308, which is in this case, memory location 310. Therefore, the free head pointer is assigned to memory location 310 and the free tail pointer is maintained as memory location 316.

FIG. 4B illustrates the method steps in one embodiment of the invention for freeing memory taken up by data packets and adding this memory to the linked list of free memory.

In step 416, the memory location assigned to the initial data pointer is linked to the memory location assigned to the free tail pointer. For example, in FIG. 3C, packet 1 previously occupied memory locations 302, 306 and 308. In this case, the free tail pointer was assigned to memory location 316. In accordance with step 416 as described in FIG. 4B, the memory location assigned to the free tail pointer 316 is linked to the memory location assigned to the initial data pointer, memory location 302.

In step 418, the free tail pointer is assigned to the memory location assigned to the end of data pointer. For example, in FIG. 3C, the end of data pointer for packet 1 was memory location 308. In this example, the free tail pointer is assigned to the memory location assigned to the end of data pointer, memory location 308. The free head pointer in this example remains assigned to memory location 310.

In FIG. 3D, packet 2 is indicated as being free memory. Thus, in accordance with step 416, the memory location 308 assigned to the free tail is linked to the initial data pointer memory location 304. Since data packet 2 only occupies one memory location, the end of data pointer is also assigned to memory location 304.

In step 418, the free tail pointer is assigned to the memory location assigned to the end of data pointer. In the example depicted in FIG. 3D, the free tail pointer is assigned to memory location 304 which was assigned to the end of data pointer.

FIG. 5 is an illustration of a system for managing a linked list memory. FIG. 5 will be described with reference to FIGS. 3A–3D. A pointer assigner 500 is responsible for linking memory locations to one another as depicted in FIG. 3A. For example, in this example, pointers are assigned to memory locations 302, 304, and 306–316.

Linker 502 directs which pointers are assigned to which memory locations. For example, in FIG. 3A, the pointer of memory location 302 is linked to memory location 304. The memory location 304 is linked to memory location 306. The memory location 306 is linked to memory location 308, etc.

The system also has a free head pointer assignor 504 and a free tail pointer assignor 506. The free head pointer assignor 504 assigns a free head pointer to the beginning of a linked list structure. In this case, the free head pointer assignor assigns a free head pointer to memory location 302 as depicted in FIG. 3A. The free tail pointer 506 assigns a free tail pointer to the last m memory location of the linked list as depicted in FIG. 3A. In this case, the free tail pointer assignor assigns the free tail pointer to memory location 316.

The system also has a initial data pointer assignor 408 which assigns an initial data pointer to the memory location the free head pointer is assigned to. For example, in FIG. 3B, packet 2 occupied memory location 304 and the free head pointer was assigned to memory location 302. The initial data pointer assignor 508 assigned the initial data pointer to memory location 302.

Data assignor 510 assigns a sufficient number of memory locations to store data packets until an end of data has been found. In this case, data packet 1 needs three memory locations. Therefore, the data assignor assigns the packet data to memory locations 306 and 308.

The end of data pointer assignor 512 determines when the end of data has been reached and assigns an end of data pointer to the memory location occupied by the end of data. In this case, the end of data pointer assignor 512 assigns an end of data pointer to memory location 308 indicating the end of data as shown in FIG. 3B.

The free head pointer assignor 504 then reassigns the free head to the next memory location in the linked list of memory assigned to the memory location the end of data pointer assignor the end of data pointer is assigned to. In this case, the end of data pointer is assigned to memory location 308. Therefore, this free head pointer is assigned to the next memory location in the linked list, memory location 310.

In the case that memory is to be freed, as illustrated in FIG. 3C, linker 502 links the memory location that the free tail pointer was pointing to the memory location the initial data pointer was assigned. In this case, as illustrated in FIG. 3C, the free tail pointer was initially assigned to memory location 316 and the initial data pointer was assigned to memory location 302. Therefore, memory location 316 is linked to memory location 302 by linker 502. Finally, in order to indicate the memory location occupied by packet 1 as free memory, the free tail pointer assignor 506 assigns the memory location assigned to the end of data pointer memory location 308 to free tail pointer. Thus, the free tail pointer is assigned to memory location 308.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A memory management method comprising the steps of:
    assigning pointers to free memory locations;
    linking said pointers to one another creating a linked list of free memory locations having a beginning and an end;
    assigning a free head pointer to a memory location indicating said beginning of free memory locations;
    assigning a free tail pointer to a memory location indicating said end of free memory locations;
    linking said memory location assigned to said free tail pointer to said memory location assigned to an initial data pointer when memory locations occupied by data is to be indicated as free memory; and
    assigning said free tail pointer to a last data memory location assigned to an end of data pointer.

2. The method as recited in claim 5 further comprising the steps of:
    assigning an initial data pointer to said memory location assigned to said free head pointer;
    assigning an end of data pointer to a last data memory location;
    assigning said free head pointer to a next memory location linked to said last data memory location assigned to said end of data pointer, wherein said next memory location indicates said beginning of free memory locations.

3. The method as recited in claim 2 wherein when data to be saved is only large enough to occupy one memory location said end of data pointer is assigned to said memory location assigned to said initial data pointer.

4. The method as recited in claim 2 wherein when data to be saved is larger than one memory location the method comprises the steps of:
    assigning a sufficient number of memory locations linked to said memory location assigned to said initial data pointer.

5. A memory management system comprising:
    a pointer assignor that assigns pointers to free memory locations;
    a linker that links said pointers to one another thereby creating a linked list of free memory locations having a beginning and an end;
    a free head pointer assignor that assigns a free head pointer to a memory location indicating said beginning of said linked list of free memory locations; and
    a free tail pointer assignor that assigns a free tail pointer to a memory location indicating said end of said linked list of free memory locations;
    wherein said linker links said memory location assigned to said free tail pointer to said memory location assigned to an initial data pointer when memory locations occupied by data is to be indicated as free memory; and
    said free tail pointer assignor assigns said free tail pointer to a last data memory location assigned to an end of data pointer.

6. The system as recited in claim 5 further comprising:
    an initial data pointer assignor that assigns an initial data pointer to said memory location assigned to said free head pointer; and
    an end of data pointer assignor that assigns an end of data pointer to a last data memory location;
    wherein said free head pointer assignor assigns said free head pointer to a next memory location linked to said last data memory location assigned to said end of data pointer, wherein said next memory location indicates said beginning of free memory locations.

7. The system as recited in claim 6 wherein when data to be saved is only large enough to occupy one memory location said end of data pointer assignor assigns said end of data pointer to said memory location assigned to said initial data pointer.

8. The system as recited in claim 6 wherein when data to be saved is larger than one memory location, a data assignor assigns a sufficient number of memory locations linked to said memory location assigned to said initial data pointer.

9. A memory management system comprising:
- a pointer assignor means for assigning pointers to free memory locations;
- a linker means for linking said pointers to one another thereby creating a linked list of free memory locations having a beginning and an end;
- a free head pointer assignor means for assigning a free head pointer to a memory location indicating said beginning of said linked list of free memory locations; and
- a free tail pointer assignor means for assigning a free tail pointer to a memory location indicating said end of said linked list of free memory locations;
- wherein said linker means links said memory location assigned to said free tail pointer to said memory location assigned to an initial data pointer when memory locations occupied by data is to be indicated as free memory; and
- said free tail pointer assignor means assigns said free tail pointer to a last data memory location assigned to an end of data pointer.

10. The system as recited in claim 9 further comprising:
- an initial data pointer assignor means for assigning an initial data pointer to said memory location assigned to said free head pointer; and
- an end of data pointer assignor means for assigning an end of data pointer to a last data memory location;
- wherein said free head pointer assignor means assigns said free head pointer to a next memory location linked to said last data memory location assigned to said end of data pointer, wherein said next memory location indicates said beginning of free memory locations.

11. The system as recited in claim 10 wherein when data to be saved is only large enough to occupy one memory location said end of data pointer assignor means assigns said end of data pointer to said memory location assigned to said initial data pointer.

12. The system as recited in claim 10 wherein when data to be saved is larger than one memory location, a data assignor means assigns a sufficient number of memory locations linked to said memory location assigned to said initial data pointer.

13. A memory management device comprising:
- a pointer assignor that assigns pointers to free memory locations of a memory, said pointer assignor in communication with said memory;
- a linker that links said pointers to one another thereby creating a linked list of free memory locations having a beginning and an end, said linker in communication with said memory;
- a free head pointer assignor that assigns a free head pointer to a memory location indicating said beginning of said linked list of free memory locations, said free head pointer assignor in communication with said memory; and
- a free tail pointer assignor that assigns a free tail pointer to a memory location indicating said end of said linked list of free memory locations, said free tail pointer assignor in communication with said memory;
- wherein said linker links said memory location assigned to said free tail pointer to said memory location assigned to an initial data pointer when memory locations occupied by data is to be indicated as free memory; and
- said free tail pointer assignor assigns said free tail pointer to a last data memory location assigned to an end of data pointer.

14. The device as recited in claim 13 further comprising:
- an initial data packet pointer assignor that assigns an initial data packet pointer to said memory location assigned to said free head pointer, said initial data packet pointer assignor in communication with said memory; and
- an end of data packet pointer assignor that assigns an end of data packet pointer to a last data packet memory location, said end of data packet pointer assignor in communication with said memory;
- wherein said free head pointer assignor assigns said free head pointer to a next memory location linked to said last data packet memory location assigned to said end of data packet pointer, wherein said next memory location indicates said beginning of free memory locations.

15. The device as recited in claim 14 wherein when a single data packet is to be saved said end of data packet pointer assignor assigns said end of data packet pointer to said memory location assigned to said initial data packet pointer.

16. The device as recited in claim 14 wherein when more than one data packet is to be saved, a data packet assignor assigns a sufficient number of memory locations linked to said memory location assigned to said initial data packet pointer, said data packet assignor in communication with said memory.

* * * * *